United States Patent Office 3,499,905
Patented Mar. 10, 1970

3,499,905
DERIVATIVES OF BICYCLIC DICARBOXYLIC ACIDS
Heinrich Koch, Westbohnstrasse 38, Vienna VII, Austria, and Johannes Kotlan, Wiedner Hauptstrasse 40, Vienna IV, Austria
No Drawing. Filed Nov. 30, 1964, Ser. No. 414,858
Claims priority, application Austria, Dec. 11, 1963, A 9,937/63
Int. Cl. C07d *29/24;* C07c *97/00;* A61k *27/00*
U.S. Cl. 260—294.3                14 Claims

ABSTRACT OF THE DISCLOSURE

Derivatives of bicyclic dicarboxylic acids of the formula

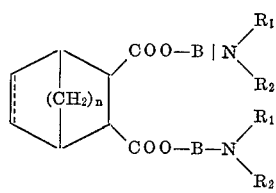

wherein $R_1$ and $R_2$ are each selected from the group consisting of lower alkyl groups and said lower alkyl groups combined to form an alkylene chain of 4 or 5 carbons, B is a straight or branched chain lower alkylene groups and $n$ is 1 or 2 and quaternary salts of said derivatives.

---

This invention relates to a process for producing new basic esters of bicyclic dicarboxylic acids, their acid addition salts and quaternary ammonium compounds, and the hydrogenation products of these substances.

Bisquaternary organic nitrogen compounds in which the intercationic structure has a chain length of 2–18 atoms are characterized by specific physiological activities. Those with relatively short chains mainly have a blocking activity on the ganglion cells and those with relatively long chains a specific inhibiting activity on neuromuscular junctions or cholinesterases. An optimum neuromuscular activity has been observed in the case of compounds in which the two quaternary nitrogen atoms are linked by a continuous chain of eight to eighteen atoms. The nature of the atoms constituting the chain is of minor significance for the physiological activity. Particularly desirable pharmacological properties have been observed, inter alia, in the case of bisquaternary basic di-esters of dicarboxylic acids, in which the two cationic centers are separated by eight to ten chain elements. Such di-esters of a large number of open-chain or cyclic dicarboxylic acids have been described in the literature. Similar derivatives of bicyclic dicarboxylic acids have not yet been produced.

The present invention relates to the synthesis of new bisdialkylaminoalkyl esters of bicyclic dicarboxylic acids of the general Formula I, compounds of the general Formula II, which constitute acid addition salts and quaternary ammonium compounds of said esters, and the saturated analogs corresponding to those compounds of Formulas I and II containing olefinic double bonds.

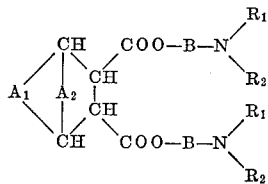

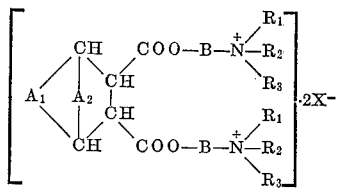

In the formula: $A_1$ and $A_2$ represent individually a bivalent, saturated or unsaturated hydrocarbon radical, in the simplest case methylene, ethylene and vinylidene groups, also larger, linear or branched, cyclic, bicyclic and aromatic radicals, which may be polynuclear. All such hydrocarbon radicals may be substituted. B represents a bivalent, linear or branched chain hydrocarbon radicals. $R_1$ and $R_2$ represent hydrocarbon radicals or represent together a cyclic polymethylene radical, which may be interrupted by heteroatoms. $R_3$ represents hydrogen or a hydrocarbon radical. X represents the anion of an inorganic or organic acid.

According to the invention, these new compounds are produced by reacting a dicarboxylic acid of the formula

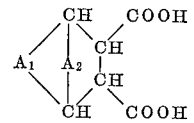

wherein $A_1$ and $A_2$ have the meaning given above, or their functional derivatives, such as halides, esters, anhydrides, salts etc., with a compound of the formula $$Z—B—D \qquad (IV)$$

wherein Z stands for OH or halogen, B has the meaning given above and D represents

or a radical which can be transformed into this group, e.g., a halogen atom, and transforming, if required, the radical D in the resulting di-ester into the desired radical

e.g., by reacting a di-haloalkyl-ester with the corresponding secondary amine, whereafter the resulting compound of Formula I is transformed, if desired, into its acid addition salt or quaternary ammonium salt and/or any existing double bonds are hydrogenated to single bonds. The carboxylic groups may assume any possible configurative positions relative to each other and to groups $A_1$ and $A_2$ (cis-, trans-, endo-, exo-positions, etc.). The production of the starting substances of Formula III is known.

For instance, halides of acids of Formula III may be reacted with amino alcohols of Formula IV. To combine the liberated hydrogen halide in this case, the amino alcohol is preferably used in an excess or another acid-combining agent is added for this purpose.

Di-esters, particularly dimethyl esters, of acids of Formula III may also be reacted with amine alcohols of Formula IV, usually in the presence of a catalyst, such as an alkali metal alcoholate. The liberated lower alcohol may be removed from the reaction mixture by azeotropic distillation.

Moreover, anhydrides of dicarboxylic acids of Formula III may be directly reacted with amino alcohols of Formula IV. In this case the water which is formed in the reaction is removed from the reaction mixture by one of the processes usual for this purpose. This procedure is also applicable to the free dicarboxylic acids.

The free dicarboxylic acids of Formula III and their salts, such as alkali metal salts, may also be reacted with aminoalkyl halides of Formula IV, suitably in the presence of an appropriate solvent. This process is desirably carried out at elevated temperatures, preferably at the boiling temperature of the solvent.

In some cases it is desirable to introduce the dialkylaminoalkyl groups into the bicyclic starting compound in a two-stage process rather than directly. In this case, D in Formula IV stands for a radical, particularly halogen, which can easily be replaced by the desired group

The intermediate product is a di-ester, which is then reacted, e.g., with the corresponding secondary amine. In a preferred embodiment of this process, a starting substance of Formula III or its functional derivative is reacted with an alkanol halide of Formula VI, wherein B has the same meaning as in Formula IV and Hal stands for chlorine, bromine or iodine, to form a di-haloalkyl-ester of Formula VII.

HO—B—Hal           (VI)

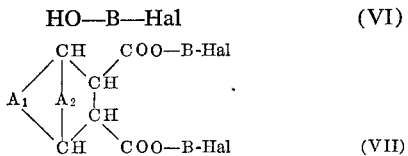

The reaction of the di-haloalkyl-esters of Formula VII with secondary amines results in the compounds according to the invention represented by Formula I. The bis-aminoalkyl-esters of Formula I may be transformed in known manner into the compounds of Formula III, which are also new, by reacting them with inorganic or organic acids or alkylating agents, such as alkyl halides, alkyl sulfates etc. This reaction is usually carried out in the presence of a non-reactive solvent, such as hydrocarbons, alcohols, ketones, etc., and, if required, at an elevated temperature, preferably the boiling temperature of the solvent, or in a closed vessel under pressure.

A modification of the process according to the invention results directly in compounds of Formula II. In this modification, starting substances of Formula III or their functional derivatives are reacted with quaternary ammonium compounds of Formula V, wherein all radicals have the same meaning as in Formulas I, II and IV.

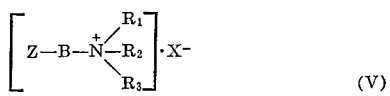

The compounds of Formula II may also be produced in one stage by the action of tertiary amines on the di-haloalkyl esters of Formula VII.

The compounds produced by any of the procedures mentioned hereinbefore and containing olefinic double bonds, excepting the substances which are halogenated in the bicyclic nucleus, may be transformed into the compounds containing a saturated ring in known manner by the addition of hydrogen in the presence of a suitable catalyst. The same saturated compounds are obtained if the corresponding saturated starting substances of Formula III are used as starting substances.

The compounds according to the invention may be used as medicines. They have an excellent ganglion blocking and neuromuscular activity.

Example 1

20 grams 1,4-endomethylene-$\Delta^5$-cyclohexene-2,3-trans-dicarboxylic acid dichloride dissolved in 100 milliliters of absolute benzene were dropped into a solution of 40 grams of β-dimethylaminoethanol in 100 milliliters of benzene with stirring and cooling. The reaction mixture was then refluxed with continued stirring for half an hour. After cooling, the mixture was shaken in a separating funnel with 200 milliliters of sodium carbonate solution (20%) and then with three 200 milliliter portions of water. The benzene solution was dried with $Na_2SO_4$, filtered and evaporated. The remaining oily residue was distilled in vacuo.

The bis-(β-dimethylaminoethyl)-ester of 1,4-endomethylene-$\Delta^5$-cyclohexene-2,3-transdicarboxylic acid boils at 180–190° C. and 2 mm. Hg, $n_D^{25}$ 1.4732, $d_4^{20}$ 1.0422, yield about 95% of theory.

Dihydrochloride.—Melting point 203–205° C.
Bis-methiodide.—Melting point 227–233° C.
Bis-ethoiodide.—Melting point 223–229° C.
Bis-ethbromide.—Melting point 191–195° C.

Hydrogenation.—9 grams of the basic ester were dissolved in five times its amount of glacial acetic acid and after addition of palladinized charcoal were shaken in a hydrogen atmosphere. After the $H_2$ absorption had been completed, the catalyst was filtered off and the solution was evaporated in vacuo. The residue was picked up in water, alkalinized with KOH, and extracted with ether. After the evaporation of the ether, the residue was distilled in vacuo. Bis-(β-dimethylaminoethyl)-ester of 1,4-endomethylene-cyclohexane - 2,3 - transdicarboxylic acid, boiling point 175–180° C., $n_D^{25}$ 1.4729, $d_4^{20}$ 1.011, yield 7.3 grams.

Dihydrochloride.—Melting point 188–192° C.
Bis-methiodide.—Melting point 169–173° C.

Instead of β-dimethylaminoethanol, other amino alcohols may be used in the above reaction. Using, e.g., β-diethylaminoethanol, α-methyl-β-dimethylaminoethanol and N-β-hydroxyethylpiperidine, respectively, the following basic esters were produced: Bis-(β-diethylaminoethyl)-ester of 1,4-endomethylene-$\Delta^5$-cyclohexene-2,3-transdicarboxylic acid, boiling point 205–215° C. at 5 mm. Hg, $n_D^{25}$ 1.4695, $d_4^{20}$ 0.9981.

Dihydrochloride.—Melting point 149–152° C.
Bis-ethiodide.—Melting point 247–253° C.

Bis-(α-methyl-β-dimethylaminoethyl)-ester of 1,4-endomethylene-$\Delta^5$-cyclohexene-2,3-transdicarboxylic acid, boiling point 190–195° C. at 5 mm. Hg, $n_D^{25}$ 1.4677, $d_4^{20}$ 1.0064.

Dihydrochloride.—Melting point 228–232° C.
Bis-methiodide.—Deliquescent crystals.

Bis-(β-piperidinoethyl)-ester of 1,4-endomethylene-$\Delta^5$-cyclohexene-2,3-transdicarboxylic acid, boiling point 205–225° C. at 5 mm. Hg, $n_D^{21}$ 1.4952.

Dihydrochloride.—Deliquescent crystals.
Bis-methiodide.—Oily.

The excess of amino alcohol used for combining the hydrogen chloride formed during the reaction may be replaced by other acid-combining substances. For instance, finely powdered anhydrous sodium carbonate was added to the reaction mixture. In this case, 2 moles of amino alcohol are to be used per mole of acid chloride. The reaction and the further processing are conducted in the same manner.

Example 2

20 grams 1,4-endoethylene-$\Delta^5$-cyclohexene-2,3-trans-dicarboxylic acid dichloride were reacted with 40 grams of β-dimethylaminoethanol in the procedure described in Example 1.

Bis-(β-dimethylaminoethyl)-ester of 1,4-endoethylene-$\Delta^5$-cyclohexene-2,3-trans-dicarboxylic acid has a boiling point of 175–195° C. at 2 mm. Hg.

Bis-methiodide.—melting point 235–238° C.

In analogous procedures, the following compounds were produced:

Bis-(β-diethylaminoethyl)-ester of 1,4-endoethylene-$\Delta^5$-cyclohexene-2,3-trans-dicarboxylic acid, boiling point 210–225° C. at 2 mm. Hg.

Dihydrochloride.—melting point 163–168° C.
Bis-ethbromide.—melting point 204–209° C.
Bis-(α-methyl-β-dimethylaminoethyl)-ester of 1,4-endoethylene-Δ⁵-cyclohexene-2,3-trans-dicarboxylic acid. Boiling point 200–210° C. at 2 mm. Hg.
Dihydrochloride.—melting point 170–180° C.
Bis-methiodide.—melting point 215–230° C.

Example 3

0.5 gram of sodium was dissolved in 40 grams β-dimethylaminoethanol. 18 grams of dimethyl ester of 1,4-endomethylene-Δ⁵-cyclohexene-2,3-trans-dicarboxylic acid were added to this solution. The mixture was heated on a water bath for 5 hours. After cooling, the low-boiling fraction was removed in vacuo. The residue was picked up in benzene and washed with water. The benzene layer was separated, dried with $Na_2SO_4$, and evaporated. The oily residue was distilled in vacuo, boiling point 185–190° C. at 2 mm. Hg. Bis-(β-dimethylaminoethyl)-ester of 1,4 - endomethylene-Δ⁵-cyclohexene-2,3-trans-dicarboxylic acid.
Dihydrochloride.—melting point 205–206° C.

Example 4

0.5 gram of sodium, 40 grams of dimethylaminoethanol and 18 grams of the dimethyl ester of 1,4-endomethylene-Δ⁵-cyclohexene-2,3-cis-dicarboxylic acid were reacted as described in Example 3. Bis-(β-dimethylaminoethyl)-ester of 1,4 - endomethylene-Δ⁵-cyclohexene - 2,3-trans-dicarboxylic acid.
Dihydrochloride.—melting point 204–206° C.
Bis-methiodide.—melting point 227–230° C.

Example 5

0.5 gram of sodium, 40 grams of β-dimethylaminoethanol and 20 grams of the dimethyl ester of 5,6;7,8-dibenzo-bicyclo-(2,2,2)-octane-2,3-trans-dicarboxylic acid (Diels-Alder adduct of fumaric acid dimethyl ester and anthracene) were reacted according to the procedure of Example 3. The resulting bis-(β-dimethylaminoethyl)-ester of 5,6;7,8-dibenzo-bicyclo-(2,2,2)-octane-2,3-trans-dicarboxylic acid is a viscous oil, which cannot be distilled and is purified by transformation to the dihydrochloride.
Bis-methiodide.—decomposition above 250° C.

Example 6

18 grams of 1,4-endomethylene-cyclohexane-2,3-trans-dicarboxylic acid, 23 grams of β-dimethylaminoethyl chloride and 100 milliliters of isopropanol were refluxed together for 6 hours. The solvent was then removed in vacuo, the residue picked up in water, alkalinized with KOH and extracted with ether. The residue remaining after the evaporation of the ether was distilled in vacuo; boiling point 170–180° C. at 2 mm. Hg. Bis-(β-dimethylaminoethyl)-ester of 1,4-endomethylene-cyclohexane-2,3-trans-dicarboxylic acid.
Dihydrochloride.—melting point 186–190° C.

Example 7

16 grams of 1,4-endomethylene-Δ⁵-cyclohexene-2,3-cis-dicarboxylic anhydride, 28 grams of choline chloride and 300 milliliters of acetone were refluxed for 30 hours with stirring. The hot mixture was filtered from the insoluble matter and the filtrate was evaporated. The residue was repeatedly re-crystallized from isopropanol.
Bis-methchloride of bis-(β-diethylaminoethyl)-ester of 1,4 - endomethyleneΔ⁵-cyclohexene - 2,3-cis-dicarboxylic acid. Melting point about 140° C. Highly deliquescent crystal mass.

Example 8

22 grams of 1,4-endomethylene-Δ⁵-cyclohexene-2,3-trans-dicarboxylic acid dichloride were introduced with stirring and cooling into an excess of ethylene chlorohydrin. The excess ethylene chlorohydrin was then distilled off in vacuo. The residue was taken up in either and shaken with water and an $NaHCO_3$ solution. The ether layer was separated, dried and evaporated. The crude di-(β-chloroethyl)-ester was dissolved in 200 milliliters of acetone without further purification. 30 grams of sodium iodide were added to the solution, which was then refluxed for 6 hours. The precipitated NaCl was filtered off and the acetone removed by distillation. The residue was again taken up in ether and washed with water and dilute thiosulfate solution. Then the ether layer was separated, dried and evaporated.

The residual di-(β-iodoethyl)-ester was dissolved in benzene and together with a solution of trimethylamine in benzene was heated in a pressure bottle at 100° C. for 6 hours. After cooling, the benzene and the excess trimethylamine were distilled off and the residue was re-crystallized from acetone-isopropanol, Bis-methiodide of bis-(β-dimethylaminoethyl)-ester of 1,4-endomethylene-Δ⁵-cyclohexene-2,3-trans-dicarboxylic acid. Melting point 230–233° C.

What we claim is:
1. A compound of the formulae:

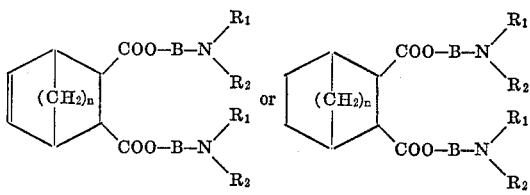

wherein $R_1$ and $R_2$ are each selected from the group consisting of lower alkyl groups and said lower alkyl groups combined to form an alkylene chain of 4 or 5 carbons, B is a straight or branched chain lower alkylene group and $n$ is 1 or 2; and the quaternary salts of said compound of the formulae:

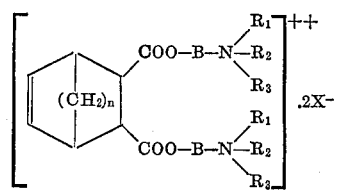

or

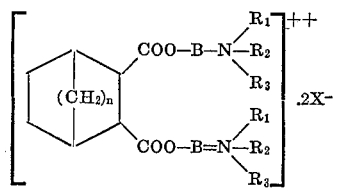

2. A compound according to claim 1 wherein $R_3$ is methyl or ethyl and X is bromide or iodide.
3. A compound according to claim 1 wherein $R_3$ is hydrogen and X is chloride.
4. A compound of the formulae:

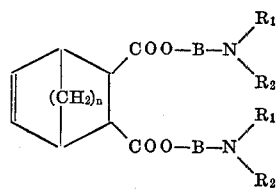

or

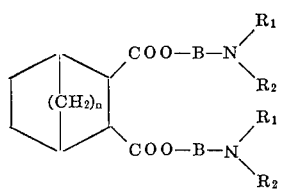

wherein $R_1$ and $R_2$ are each methyl or ethyl, or form together with N, a piperidine ring, B is —$CH_2$—$CH_2$— or

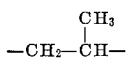

and $n$ is 1 or 2; and the quaternary salts thereof having the formulae:

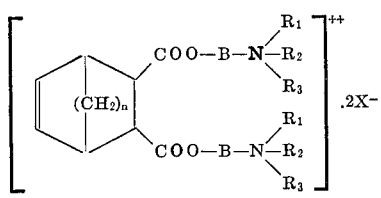

or

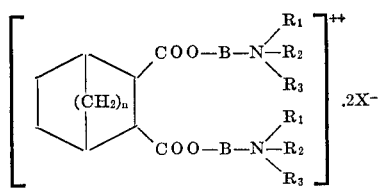

wherein $R_1$, $R_2$ B and $n$ are as defined above, $R_3$ is hydrogen, methyl or ethyl, and X is chloride, bromide or iodide.

5. Bis-($\beta$-dimethyl-aminoethyl)ester of 1,4-endomethylene-$\Delta^5$-cyclohexene-2,3-transdicarboxylic acid.
6. Bis-($\beta$-diethyl-aminoethyl)ester of 1,4-endomethylene-$\Delta^5$-cyclohexene-2,3-transdicarboxylic acid.
7. Bis-($\beta$-dimethyl-aminoethyl)ester of 1,4-endomethylene-cyclohexane-2,3-transdicarboxylic acid.
8. Bis-($\beta$-diethyl-aminoethyl)ester of 1,4-endomethylene-cyclohexane-2,3-transdicarboxylic acid.
9. Bis-($\beta$-piperidino ethyl)ester of 1,4-endomethylene-$\Delta^5$-cyclohexene-2,3-transdicarboxylic acid.
10. Bis-($\beta$-dimethyl-aminoethyl)ester of 1,4-endoethylene-$\Delta^5$-cyclohexene-2,3-transdicarboxylic acid.
11. Bis-($\beta$-diethyl-aminoethyl)ester of 1,4-endoethylene-$\Delta^5$-cyclohexene-2,3-transdicarboxylic acid.
12. Bis-($\alpha$-methyl-$\beta$-dimethylaminoethyl)ester of 1,4-endomethylene-$\Delta^5$-cyclohexene-2,3-transdicarboxylic acid.
13. Bis-($\alpha$-methyl-$\beta$-dimethylaminoethyl)ester of 1,4-endoethylene-$\Delta^5$-cyclohexene-2,3-transdicarboxylic acid.
14. Bis-($\beta$-dimethylaminoethyl)ester of 5,6,7,8-dibenzobicyclo-(2,2,2,)-octane-2,3-transdicarboxylic acid.

References Cited
UNITED STATES PATENTS 2,797,227   6/1957   Jenkins _____ 260—326.3

LORRAINE A. WEINBERGER, Primary Examiner

PAUL KILLOS, Assistant Examiner

U.S. Cl. X.R.

260—326.3, 468, 999